United States Patent
Morales (10) Patent No.: US 11,733,938 B2
(45) Date of Patent: Aug. 22, 2023

(54) METHODS AND PRINTING SYSTEM FOR VIRTUAL CALIBRATION AND VERIFICATION SERVICES

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/530,877

(22) Filed: Nov. 19, 2021

(65) Prior Publication Data

US 2023/0161521 A1    May 25, 2023

(51) Int. Cl.
G06F 3/12        (2006.01)
H04N 1/00      (2006.01)

(52) U.S. Cl.
CPC .......... *G06F 3/1208* (2013.01); *G06F 3/1205* (2013.01); *G06F 3/1224* (2013.01); *H04N 1/00087* (2013.01)

(58) Field of Classification Search
CPC combination set(s) only.
See application file for complete search history.

(56) References Cited

U.S. PATENT DOCUMENTS

| | | | |
|---|---|---|---|
| 8,451,495 B2 | 5/2013 | Mestha et al. | |
| 10,908,862 B1* | 2/2021 | Takahashi | G03G 21/203 |
| 2012/0081719 A1* | 4/2012 | Hattenberger | H04N 1/6036 358/1.9 |
| 2014/0146331 A1* | 5/2014 | Sato | H04N 1/6097 358/1.9 |
| 2015/0356381 A1* | 12/2015 | Choulet | G06K 15/027 358/1.9 |
| 2020/0267274 A1* | 8/2020 | Haga | H04N 1/00464 |
| 2020/0293241 A1* | 9/2020 | Hayashi | H04N 1/40 |
| 2021/0185181 A1* | 6/2021 | Tomii | G06F 3/1229 |
| 2021/0331503 A1* | 10/2021 | Van Vliembergen | B41J 3/46 |
| 2022/0053098 A1* | 2/2022 | Wright | H04N 1/6033 |

* cited by examiner

*Primary Examiner* — Helen Zong
(74) *Attorney, Agent, or Firm* — Millen, White, Zelano & Branigan, P.C.; William Nixon (57) ABSTRACT

A virtual calibration system uses a reference printing device to add new printing devices and perform verification operations. The reference printing device is defined using color printing resources from an initial printing device. Policies define environmental specification information regarding the operating conditions for a printing device in the system. When a new printing device is added, the new printing device performs a match calibration using the color printing resources provided by the reference printing device. If the match calibration is acceptable, then the new printing device is added to the virtual calibration system. The reference printing device also instructs the printing devices to perform quality checks and to provide environmental information. Using the environmental information, the reference printing device determines if an issue is impacting color printing that is not related to the color printing capabilities of the printing device.

12 Claims, 8 Drawing Sheets

METHODS AND PRINTING SYSTEM FOR VIRTUAL CALIBRATION AND VERIFICATION SERVICES

FIELD OF THE INVENTION

The present invention relates to a printing system that implements virtual calibration of printing devices as well as verification services of color reproduction accuracy.

DESCRIPTION OF THE RELATED ART

In the production print space, customers expect ongoing support from the vendor as well as sellers. Most of this support involves the typical hardware breaks and fixes along with troubleshooting such hardware problems. Customers also expect help with ensuring that the printing device's color reproduction is the best that it can be. In some cases, these scenarios induce support for calls to resolve issues that are either not an issue due to improper customer expectations or that are really operator error. These scenarios may not be apparent to support unless someone visits the production printing shop.

SUMMARY OF THE INVENTION

A method for using a cloud-based printing system is disclosed. The method includes defining a reference printing device in the cloud-based printing system using color printing resources and environmental specification information. The method also includes monitoring the reference printing device to be in compliance with requirements for the color printing resources and the environmental specification information. The method also includes installing a new printing device within the cloud-based printing system. The method also includes performing a match calibration of the new printing device using the color printing resources. The method also includes comparing environmental information for the new printing device to the environmental information for the reference printing device. The method also includes alerting an operator if the match calibration is not successful or if the environmental information for the new printing device does not meet the environmental specification information for the reference printing device.

A method for monitoring an installed printing device in a cloud-based printing system is disclosed. The method includes sending an instruction to perform a quality check at the installed printing device within the cloud-based printing system from a reference printing device. The method also includes performing the quality check at the installed printing device. The method also includes evaluating the quality check at the reference printing device using a policy for operating the installed printing device. The method also includes determining that an issue with color reproduction exists at the installed printing device based on the evaluation. The method also includes requesting that a correction action be taken at the installed printing device. The correction action is sent from the reference printing device.

A cloud-based printing system is disclosed. The cloud-based printing system includes a plurality of printing devices. The cloud-based printing system also includes a reference printing device having color printing resources and environmental specification information defined in a policy. The policy is applied to the plurality of printing devices. The cloud-based printing system also includes an installed printing device of the plurality of printing devices. The installed printing device performs a match calibration to the reference printing device using the color printing resources. The installed printing device performs a quality check when instructed by the reference printing device. The reference printing device evaluates the quality check according to the policy and the match calibration. The reference printing device determines whether an issue exists with color reproduction at the installed printing device based on the quality check or the match calibration.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments include a printing system of printing devices that facilitates verification of color reproduction accuracy and ensures that operator errors are addressed before a service call is initiated. The printing system implements a virtual calibration system using a reference printing device and the printing devices over a cloud-based service. To enable these features, the printing system would setup a printing device as the reference printing device for the cloud-based service. The reference printing device is defined by performing a calibration on the printing device and then using the measurement and tone reproduction curve (TRC) data from that calibration to define a reference printing device in the cloud-based system.

The disclosed embodiments also define policies for the reference printing device. The policies would cover expected operator actions for the printing device. For example, the policies may address temperature range, humidity range, temperature change rate such as the maximum temperature change over a defined time period, humidity change rate such as the maximum humidity change over a defined time period, ink temperature range, ink temperate change rate such as the maximum ink change over defined time period, paper acclimation time, quality check schedule, quality check measurement window, recalibration measurement window, and International Color Consortium (ICC) profile measurement window.

The quality check schedule may include days or the week and a window of time in which to perform the quality check. The quality check measurement window may include the time after printing within which to measure a target. The recalibration measurement window may include the time after printing within which to measure a target. Recalibration may be performed if the quality check fails. The ICC profile measurement window may include the time after printing within which to measure the target.

Once a reference printing device is defined, the printing system would monitor the printing device for the above information. The printing system would warn the operator if the printing device was close to not being in compliance. The warning may be in the virtual calibration system, the printing device, or via notifications. The printing system also may warn the operator if the printing device is out of compliance.

As long as the reference printing device is in compliance, it becomes available for the company or a reseller customer to use as a reference. After a new printing device is installed, the operator registers the printing device with the cloud-based service. As part of this registration, the operator is asked to perform a match calibration against the reference printing device from the cloud-based service. The installed printing device downloads the measurement data and calibration curves from the reference printing device to perform a match calibration against the reference printing device. If the match calibration is successful, then this information is shown to the operator. In addition, the reference printing device in the cloud-based service compiles a list of printing devices that are matched against it. The reference printing device also may note the match calibration status for the installed printing device.

The installed printing device then may upload the environmental information to the reference printing device. The environmental information may include temperature, humidity, and ink temperature. If the environmental information is out of compliance, then the installed printing device may show a warning to the operator. In addition, the reference printing device may note this situation as well.

In addition, the installed printing device will provide mechanism for the operator to scan the universal product codes for papers and paper patch identifiers, which are typically another barcode in the secondary packaging. The reference printing device may store this information, along with a timestamp. If the operator of the installed printing device, or even reference printing device, tries to use the paper before it acclimates, then the respective printing device will show a warning to the operator. For example, in some embodiments, the paper must be in the same room as the printing device for a period of 24 hours. The reference printing device also may store this information.

When the installed printing device performs a quality check, the information will be sent to the reference printing device. The reference printing device will evaluate the data and return a pass/fail status for the quality check. The reference printing device may retain the status and the status also is shown at the printing device. If the quality check or the measurement of the quality check is not performed per defined policies, then the information also may be shown in the printing device. The reference printing device also may store this information.

For a detected issue with the color reproduction of the printing device, the support staff at the sales company or reseller may have the option to review the information in the reference printing device. If anything is out of compliance, then the support staff may request that the customer correct the issues before someone is sent to troubleshoot color printing issues. This feature ensures that support staff are not sent to troubleshoot customer accounts with what in reality is not a printing device problem but an environmental or maintenance issue.

Thus, the disclosed embodiments enable virtual calibration in which two printing devices are matched to each other through an intermediary, or cloud-based, service. The disclosed embodiments also provide the ability to programmatically verify customer compliance with quality control policies.

Figure 1:
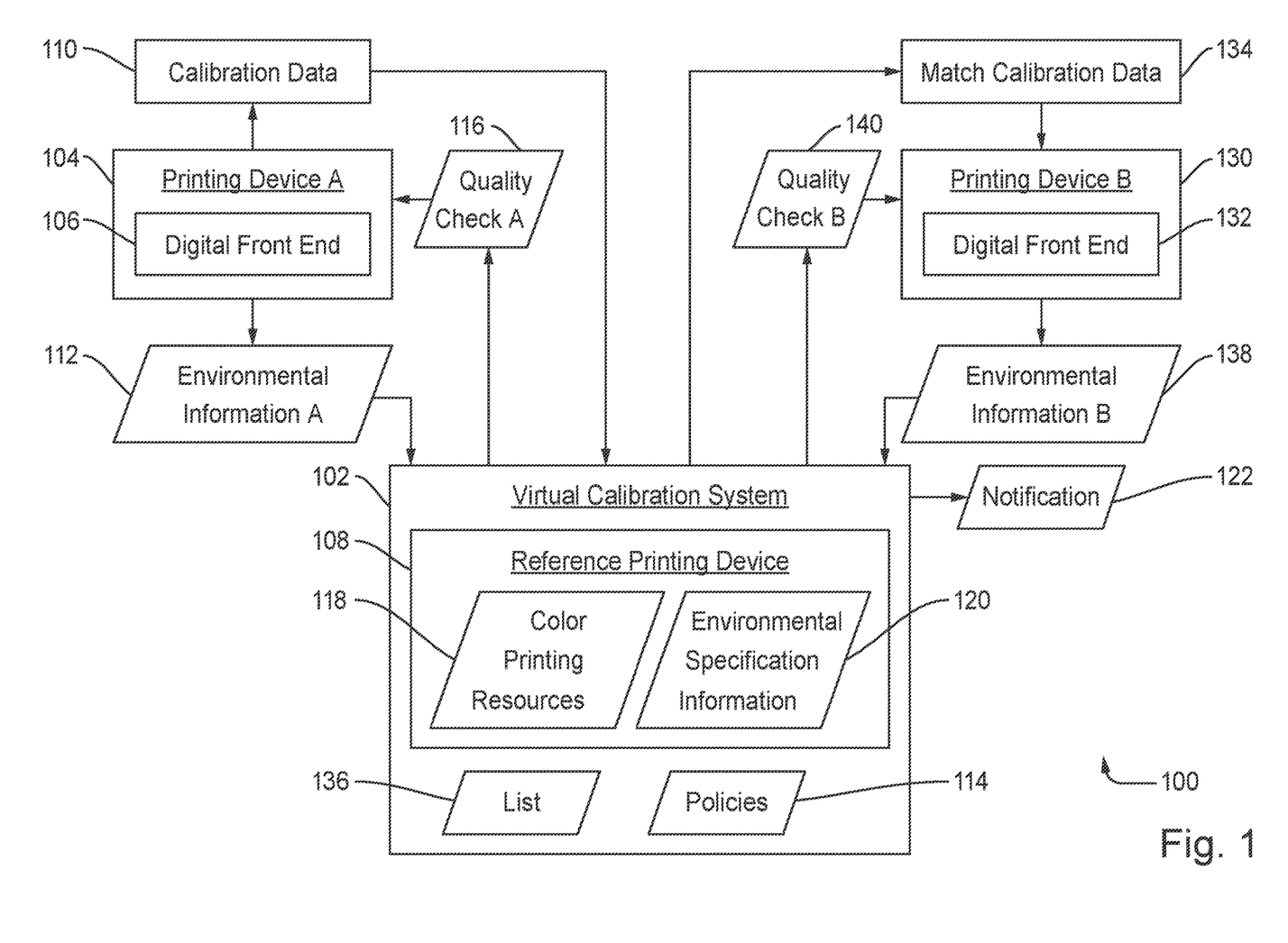
FIG. 1 illustrates a printing system for printing documents using a virtual calibration system according to the disclosed embodiments.

FIG. 1 depicts a printing system 100 for printing documents using a virtual calibration system 102 according to the disclosed embodiments. Printing system 100 may be located in a print shop or other environment suitable for production printing operations. Printing system 100 includes one or more printing devices that receive print jobs. Virtual calibration system 102 may include a reference printing device 108, which is defined using data and information from initial printing device 104. Initial printing device 104 may be an actual printing device within system 100.

Printing device 104 is disclosed in greater detail below. It includes an embedded digital front end (DFE) 106, or a printing device controller, that is the workflow touchpoint which accepts a print job, or print file, commonly a PDF or PostScript file. DFE 106 converts the file of a received print job into a format that print engine 260, disclosed below, can use to lay down the content of the document corresponding to the print job on a media. DFE 106 may include a raster image processor (RIP) as well as other components. DFE 106 also may schedule when a received print job is processed and other operations related to printing operations.

In some embodiments, an operator would setup printing device 104 as reference printing device 108 to enable virtual calibration system 102. A calibration is performed on printing device 104 to generate calibration data 110. Calibration data 110 may include the measurement data captured during the calibration operations at printing device 104 along with tone reproduction curve (TRC) data as well as any applicable settings determined using the measurement data. Calibration data 110 is provided to virtual calibration system 102 for defining color printing resources 118 at reference printing device 108.

Policies 114 also may be defined for reference printing device 108 and to be used in virtual calibration system 102. Policies 114 would cover expected operator actions for a printing device within printing system 100. The policies may address certain environmental parameters applicable to printing device 104. These parameters corresponding to environmental conditions during normal printing operations. The parameters may be defined by environmental specification information for reference printing device 108.

If a printing device falls outside these parameters, then there may be a problem to be addressed, which does not require personnel to visit the location of the printing device. Example parameters defined by policies 114 may include temperature change, humidity change, temperature change rate (maximum temperature change over a defined period of time), humidity change rate (maximum humidity change over a defined period of time), ink temperate range, ink temperature rate (maximum ink temperate change over a defined period of time), paper acclimation time, and the like.

Policies 114 also may define a quality check schedule, which sets forth the days or the week as well as the window of time to perform a quality check. They also may define a quality measurement window for the time after printing within which to measure a target. For example, if a target sheet is printed for a quality check, then a policy may define that it is measured within 15 minutes to accurately capture the capabilities of the printing device undergoing the quality check. Policies 114 also may define a recalibration measurement window for the time after printing within which to measure a target. Recalibration is performed if the quality check fails. Policies 114 also may define an ICC profile measurement window for the time after printing within which to measure a target for ICC profile capability determinations.

Once reference printing device 108 is defined and virtual calibration system 102 set up, it may monitor printing device 104 for the parameters specified in policies 114. As set forth in the policies, a quality check A 116 is sent according to a schedule to printing device A 104 to perform certain operations as well as to generate information to send back to reference printing device 108. This information may be known as environmental information A 112. Environmental information A 112 should include data for the parameters defined by policies 114, such as temperature, humidity, ink temperature, and the like.

Virtual calibration system 102 may use environmental information A 112 to determine printing device 104 is close to not being in compliance with policies 114 for a reference printing device 108. For example, if a temperature detected at printing device 104 is within 10% of a limit specified by the temperature range parameter in policies 114, then virtual calibration system 102 may warn the operator that the printing device may not be in compliance. These alerts may allow the operator to address potential problems before they impact printing device performance. Printing system 100 or virtual calibration system 102 may warn the operator in the virtual calibration system 102, printing device 104, or using a notification 122.

As long as reference printing device 108 is in compliance with policies 114, it may be used as a reference for sales or resellers when installing new printing devices. For example, printing device B 130 may be a new printing device being installed into printing system 100. After initial installation, printing device 130 registers with virtual calibration system 102. This registration includes an expanded process similar to the derived process using printing device 104, which is the initial printing device to define reference printing device 108.

As part of the registration, the operator is requested to perform a match calibration of new printing device 130 against reference printing device 108 of virtual calibration system 102. Printing device 130 also includes DFE 132, which enables printing operations. Printing device 130 downloads match calibration data 134 from reference printing device 108 and virtual calibration system 102. Match calibration is disclosed in greater detail below. Match calibration data 134 includes the measurement data and TRC, or calibration, data stored for reference printing device 108, preferably as color printing resources 118. Printing device 130 performs the match calibration against match calibration data 134. If the match calibration is successful, then printing device 130 is added to a list 136 of printing devices matched to reference printing device 108 and available to virtual calibration system 102. This information may be shown to the operator. Reference printing device 108 also notes the match calibration status for printing device 130.

After the match calibration, printing device 130 uploads environmental information B 138 to virtual calibration system 102 and reference printing device 108. Environmental information B 138 includes temperature, humidity, and ink temperature for printing device 104. DFE 132 may monitor this data and collect it to be sent to reference printing device 108 of virtual calibration system 102. Reference printing device 108 receives this information and compares it to environmental specification information 120 set forth in policies 114. If environmental information B 138 is out of compliance, then virtual calibration system 102 may show a warning to the operator. For example, printing device 130 will display a warning. Reference printing device 108 may note this as well.

Reference printing device 108 sends quality check B 140 to printing device 130 as well. Printing device 130 performs quality check operations and sends this information to reference printing device 108. Reference printing device 108 evaluates the check data and returns a pass/fail for the quality check. These operations are disclosed in greater detail below. If quality check B 140 or the measurement of the quality check is not performed per defined policies 114, then this information also is shown at printing device 130 or elsewhere in virtual calibration system 102. Reference printing device 108 also stores this information. Recalibration and ICC profile creation may be treated in the same manner as quality check B 140.

If there is an issue with color reproduction of printing device 130, then support of printing system 100 has the option to review the information in reference printing device 108. If anything is out of compliance, then the support may request that the customer correct the issues before someone is set to troubleshoot color issues. For example, if printing device 130 does not meet the quality check requirements for color reproduction or is at a high temperature, then an operator at the location for printing device 130 may take steps to bring the printing device into compliance. Using the above example, it may be determined that the paper used for quality check B 140 has not been at room temperature for 24 hours, according to policies 114. This feature ensures that support personnel are not sent to the location for what in reality is not a printing device problem but an environmental or maintenance issue.

It should be noted that printing device 104, as the initial printing device, also may serve as reference printing device 108. They are shown separately in FIG. 1 for illustrative purposes. Further, reference printing device 108 is part of virtual calibration system 102. Actions for reference printing device 108 may actually be performed at initial printing device 104. FIG. 1 discloses the fact that once reference printing device 108 is defined, it interacts with printing device 104 much as it does other printing devices within system 100.

Figure 2:
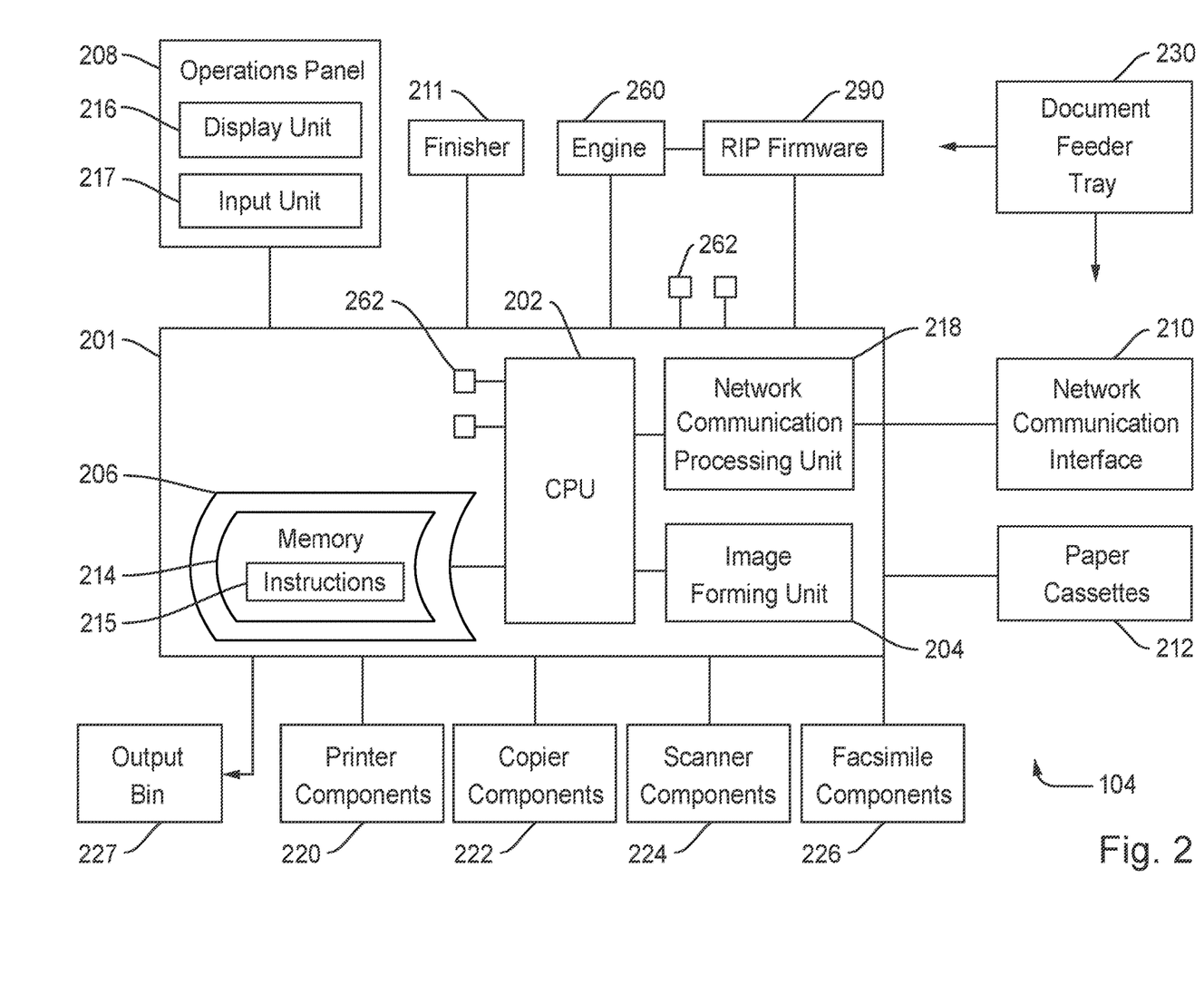
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100, such as printing device 130. As disclosed above, printing device 104 may send and receive data from virtual calibration system 102, reference printing device 108, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused.

Document processor input feeder tray 230 may include the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Sensors 262 also may be used to collect environmental information A 112 for use with virtual calibration system 102. For example, sensors 262 may capture temperature, humidity, ink temperature, and other data to be used to determine whether printing device 104 meets the environmental specifications and associated parameters set forth by virtual calibration system 102.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 may communicate with virtual calibration system 102 and printing device 130 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from other devices within system 100.

Figure 3:
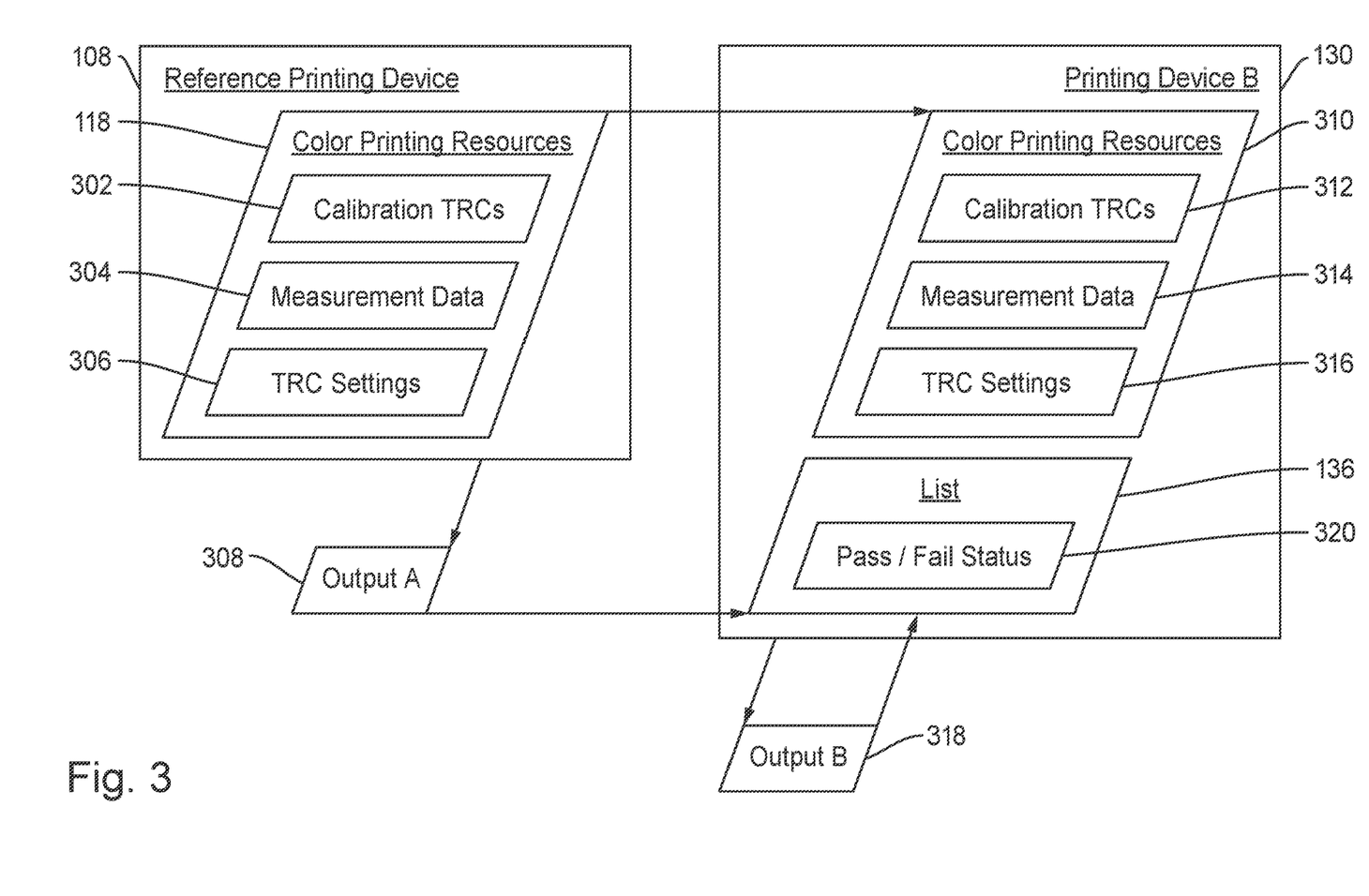
FIG. 3 illustrates a block diagram of a match calibration operation according to the disclosed embodiments.

FIG. 3 depicts a block diagram of a match calibration operation according to the disclosed embodiments. Match calibration is performed between two or more printing devices, for example, reference printing device 108 and printing device 130 which is being added to virtual calibration system 102. This feature ensures that a printing device within virtual calibration system 102 produces a reasonable maximum density. Reference printing device 108 provides a benchmark to use in this initial calibration. The embodiments disclosed by FIG. 3, however, also may be used in verification operations after recalibration to determine if the recalibration passed.

Once match calibration is established between printing devices, virtual calibration system 102 may consider them a group to be used in conjunction with updating color printing resources to provide stable and predictable color reproduction. In some embodiments, a determination is made that an output A 308 of reference printing device 108 matches a density of output B 318 of printing device 130 as well as other printing devices.

Reference printing device 108 implements color printing resources 118, which include calibration TRCs 302 that are associated with measurement data 304 and TRC settings 306. In some embodiments, printing device 104 provides the data for these items in calibration data 110. In other words, measurement data 304 is captured by printing device 104 using calibration operations. Calibration TRCs 302 and TRC settings 306 are defined at printing device 104 as well. These features then are provided to define color printing resources 118 for reference printing device 108 in order to enable match calibration with other printing devices added to virtual calibration system 102. As may be appreciated, output A 308 actually comes from printing device 104 acting as reference printing device 108.

Printing device 130 implements color printing resources 310, which include calibration TRCs 312 that are associated with measurement data 314 and TRC settings 316. Printing devices 108 and 130 may determine if they "match" in that they are expected to provide the same linearized output using their respective TRCs during color printing operations. In other words, a print job distributed across both printing devices should yield the same result when it comes to the printed colors. There should not be any variation between the colors.

According to the disclosed embodiments, printing device 130 downloads color printing resources 118 as match calibration data 134. Thus, calibration TRCs 302 are downloaded from reference printing device 108 to printing device 130. Measurement data 304 are downloaded from reference printing device 108 to printing device 130. TRC settings 306 are downloaded from reference printing device 108 to printing device 130, if applicable. In some instances, color printing resource 118 may include target output 308 generated using calibration TRCs 302.

Printing device 130 also includes its own calibration TRCs 312, measurement data 314, and TRC settings 316. Printing device 130 performs its own calibration operations to generate these features, shown as color printing resource 310 in FIG. 3. These items differ from color printing resources 118 provided by reference printing device 108. Calibration TRCs 302 downloaded from reference printing device 108 are used as the target in the match calibration. In other words, the linearized densities from reference printing device 108 are downloaded to printing device 130 so they can be used as the target for the match calibration. Printing device 130 will use its measurement data 314 to create a calibration TRC 312 that produces the same densities as reference printing device 108.

It should be noted that the values for reference printing device 108 and printing device 130 may be defined as absolute densities. An operator, however, may see values that are percentages of each printing device's maximum density. For example, to achieve the same density in output A 308 and output B 318, reference printing device 108 may define an end point target (EPT) of 95% and printing device 130 may define an EPT of 97%. The CMYK values, however, shown in output A 308 and output B 318 should be substantially identical. The operation to compare or match output A 308 and output B 318 may be referred to as a verification operation. The disclosed embodiments may execute a verification operation between reference printing device 108 and one or more printing devices within system 100.

For example, output A 308 and output B 318 may show densities for a colorant at each step, or show a percentage of colorant for each step. Output 308 may act as a target output. Instead of finding the highest densities, the match calibration operation may analyze the highest density for printing device 130 to compare density ramp for the calibration to make sure these densities match the densities of reference printing device 108. Thus, output B 318 may include the density curve from printing device 130. As long as maximum density of printing device 130 is higher than the maximum density of reference printing device 108, the color curves are built to give the same output.

During the match calibration operations, printing device 130 performs a calibration operation to determine whether its response is the same as reference printing device 108. Printing device 130 may use measurement data 314 which results in calibration TRCs 312. The verification operation may be used to determine whether a match calibration between the two printing devices results is a pass or fail. In other words, the match calibration operations may be treated as a calibration operation for printing device 130. Match calibration pass/fail status 320 is determined based on the comparison of output A 308 and output B 318. The match calibration should match densities that are output at the printing devices to print consistent colors. For example, stable reproduction, or matched densities, may be achieved between calibration TRCs 302 and calibration TRCs 312.

As disclosed above, if the match calibration is successful, then this information may be shown to the operator. Reference printing device 108 has a list 136 of printing devices that are matched against it. List 136 also may note pass/fail status 320 to indicate a status for accepted printing devices in virtual calibration system 102.

Figure 4A:
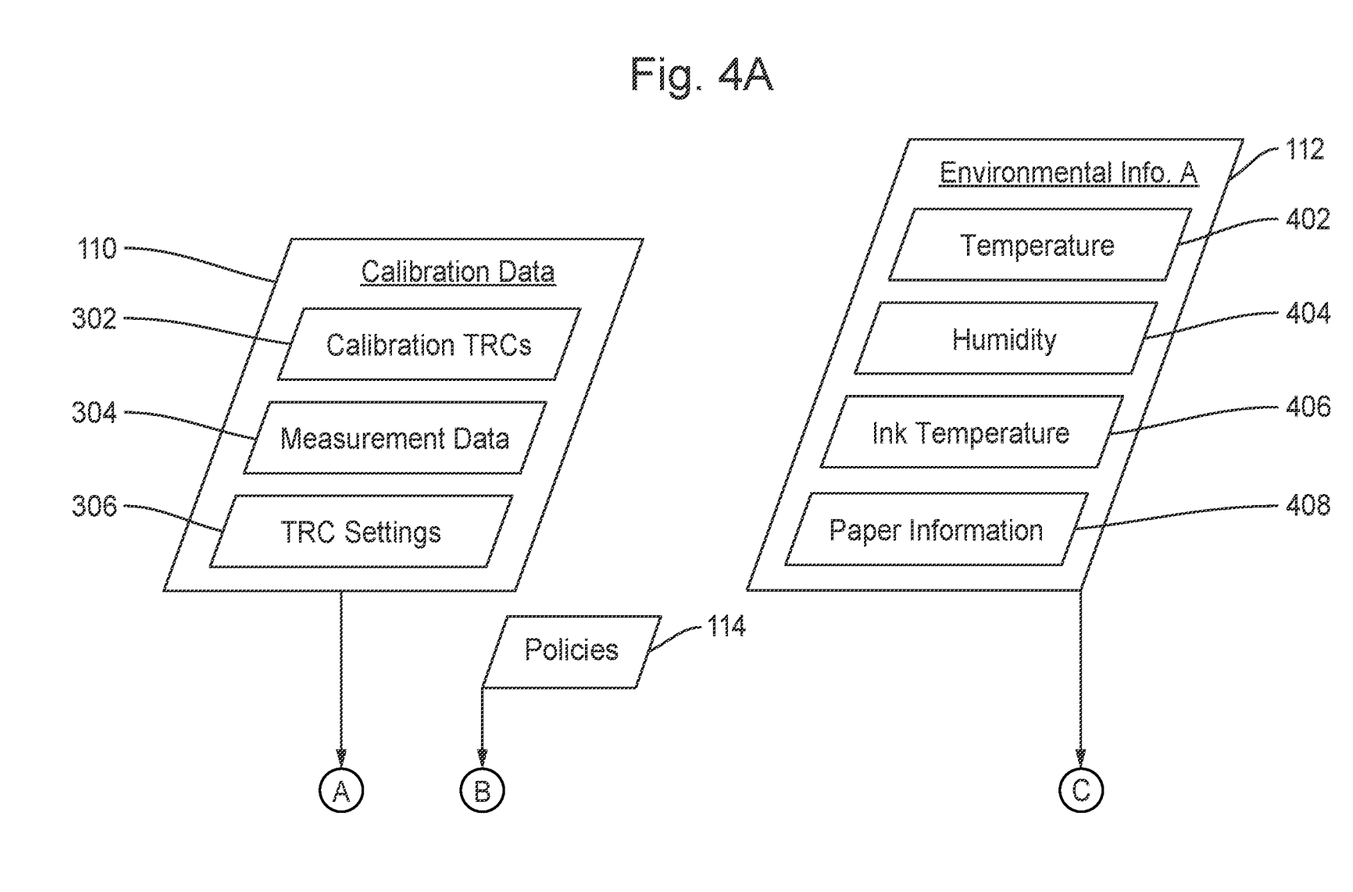
FIG. 4A illustrates a block diagram of data and information flow from the initial printing device to the reference printing device according to the disclosed embodiments.
Figure 4B:
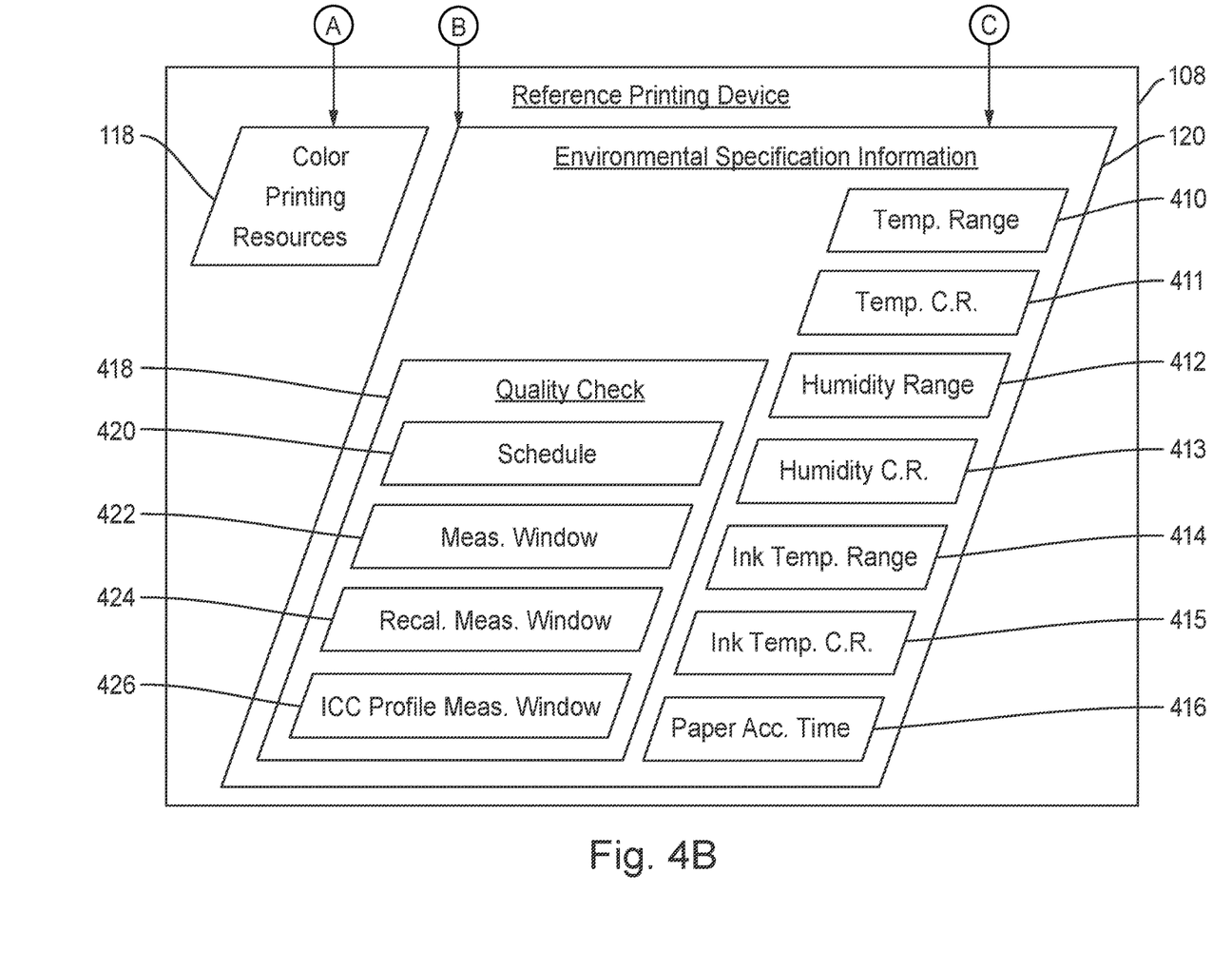
FIG. 4B further illustrates a block diagram of data and information flow from the initial printing device to the reference printing device according to the disclosed embodiments.

FIGS. 4A and 4B depict block diagrams of data and information flow from initial printing device 104 to reference printing device 108 according to the disclosed embodiments. As disclosed above, "initial" printing device 104 may serve as the basis for data used for reference printing device 108 when it is set up and maintained in virtual calibration system 102. Printing device 104 and reference printing device 108 physically may be the same printing devices. The match calibration operations disclosed above would be performed as though the match calibration occurs between print device 104 and printing device 130, based on the color printing resources provided when reference printing device 108 is defined.

Printing device 104 may perform a calibration operation or operations to generate TRCs, TRC settings, ICC profiles, and the like used for color printing operations. Printing device 104 may print one or more targets and measure them using known processes to generate measurement data 304. Measurement data 304 is then used to generate calibration TRCs 302. TRC settings 306 also may be defined. TRC settings 306 may include end point targets, aims, ink limits, and the like. Printing device 104 may use these components when color printing.

When virtual calibration system 102 indicates that reference printing device 108 is to be set up, printing device 104, acting as the initial printing device, provides calibration data 110 to act as color printing resources 118 for the reference printing device. Calibration data 110 includes calibration TRCs 302, measurement data 304, and TRC settings 306 generated at printing device 104. This data is sent to virtual calibration system 102. As disclosed above, this information captures the operation condition of printing device 104 at that point in time. These resources may change at printing device 104 over time, but are used by reference printing device 108 when adding new printing devices to the virtual calibration system.

Virtual calibration system 102 also monitors printing device 104 using reference printing device 108. Environmental information A 112 is provided from printing device 104. This information includes temperature 402 as detected at the printing device, humidity 404 as detected at the printing device, ink temperature 406 as detected at the printing device, and paper information 408 regarding papers being used at the printing device. The use of paper information 408 is disclosed in greater below.

Temperature 402 may be taken at printing device 104 at a point in time. Alternatively, several data points may be taken for the temperature to determine any rate of temperature change. Humidity 404 and ink temperature 406 may be treated in the same manner. When reference printing device 108 is being defined, printing device 104 may provide environmental information A 112 to virtual calibration system 102 to ensure the printing device meets the parameters set forth in policies 114 for the proper operation of a printing device in system 100. If environmental information A 112 is acceptable, then calibration data 110 may be used to define color printing resources 118 of reference printing device 108. If not, then the setting up of reference printing device 108 may be delayed until printing device 104 is operating within the conditions to comply with policies 114. Alternatively, virtual calibration system 102 may look for another printing device to use in defining reference printing device 108.

Environmental information A 112 from printing device 104 may be analyzed in view of environmental specification information 120. FIGS. 1 and 4 show environmental specification information 120 as being part of reference printing device 108, but it also may be stored at a location accessible by virtual calibration system 102. Environmental specification information 120 includes parameters that define the preferred operation conditions of printing devices within system 100. These parameters are defined by policies 114, which may be generated by operators of system 100.

The parameters include temperature range 410, which may define the acceptable temperature range for a printing device to operate. If the printing device is outside temperature range 410, then a problem may be occurring as result. The temperature at the location of the printing device may be addressed instead of sending personnel to service the printing device. Temperature change rate 411 also may be defined. Temperature 402 may include several instances of temperature data taken over a period of time. If the change rate shown by these instances exceeds temperature change rate 411, then operators of the printing device may be alerted.

The same analysis may be used with regard to humidity range 412 and humidity change rate 413 as well as ink temperature range 414 and ink temperature change rate 415. Ink temperature may be important as properties of the ink may vary at different temperatures. If the ink temperature is high, then printing reproduction is impacted at the printing device. Reference printing device 108 receives environmental information A 112 received from printing device 104 and compares it to the parameters to ensure that the printing device is in compliance. If not, then a notification 122 may be issued as a warning that there may be a problem at the printing device.

Environmental specification information 120 also includes paper acclimation time 416. If an operator tries to use a paper before it has acclimated to its location at the printing device, then printing reproduction may be impacted as the paper is not at "room temperature" along with the printing device. For example, policies 114 may specify using paper acclimation time 416 that the paper must be in the same room as the printing device for 24 hours. Thus, paper information 408 may provide such information on the papers being used at the printing device to be used in verification operations.

As disclosed above, reference printing device 108 or virtual calibration system 102 may send quality check A 116 to printing device 104 to elicit the collection of environmental information A 112. Thus, policies 114 may define how to use the quality checks, and used in environmental specification information 120. Alternatively, quality check specification information 418 may be its own dataset within reference printing device 108.

Quality check specification information 418 includes quality check schedule 420, which specifies the days of the week and window of time in which to perform a quality check. The quality check may include a match calibration operation, if desired, and the capture of environmental information A 112 at the printing device. Quality check measurement window 422 may define the time after printing within which to measure a target being used for the quality check. For example, the printing device may print a target sheet with color patches on it that are used to capture data from the quality check. Any measurements using the target sheet should occur within quality check measurement window 422. Otherwise, the quality check may need to be redone.

In the same manner, recalibration measurement window 424 and ICC profile measurement window 426 may be defined. Recalibration may be done if the quality check fails. A time is specified in which to measure a target in order to complete the operation. If the measurements are not received within the specified times, then the operations may need to be repeated.

It should be noted that when a printing device is added to virtual calibration system 102, the same analysis may be performed. For example, environmental information B 138 from printing device 130 is provided with temperature 402, humidity 404, ink temperature 406, paper information 408, and any measured data. Environmental information B 138 is compared to environmental specification information 120 as disclosed above. Quality check B 140 to printing device 130 is treated much the same way as quality check A 116 to printing device 104. Thus, policies 114 are enforced to programmatically verify compliance using virtual calibration system 102.

Figure 5:
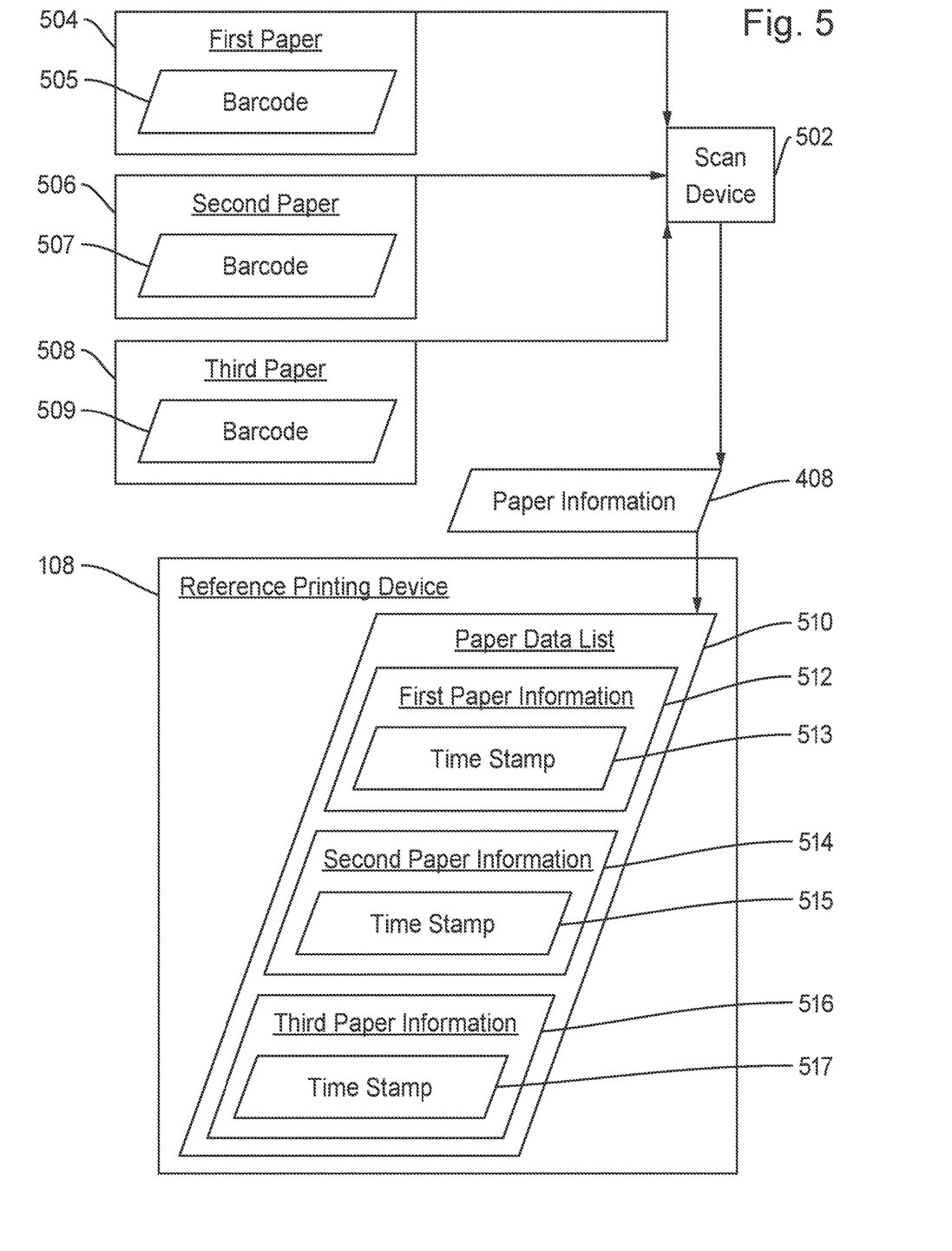
FIG. 5 illustrates a process to enable paper acclimation at a printing device according to the disclosed embodiments.

FIG. 5 depicts a process to enable paper acclimation at a printing device according to the disclosed embodiments. As disclosed above, policies 114 may define paper acclimation time 416 as a parameter to be used by virtual calibration system 102 in verification operations. Paper should be acclimated to the room or location of the printing device before being used in printing operations. Use before the paper is acclimated may result in problems with printing reproduction.

A printing device within system 100, such as printing device 104 or printing device 130 will provide a device for the operator to scan paper UPCs and paper patch identifiers, which may be another barcode in the secondary packaging. Thus, scan device 502 may be connected to the respective printing device, either directly or wirelessly, to capture data that is provided to the printing device. Scan device 502 may scan barcodes, QR codes, or other graphical information that identifies the paper being captured.

For example, the printing device may use three different types of paper. First paper 504 includes barcode 505. When first paper 504 is placed in the location with the printing device, it is scanned (or a package of paper if in one or more boxes). Scan device 502 uses the captured barcode to identify the type of paper, size, and other information. This data may be placed along with a timestamp in paper information 408 that will be provided from the printing device to reference printing device 108.

Second paper 506 may arrive later in the day than first paper 504. Barcode 507 is scanned to capture the information for second paper 506 along with the timestamp. Third paper 508 may be delivered the day after first paper 504 and second paper 506. Barcode 509 is scanned as well and the information for third paper 508 provided along with a timestamp in paper information 408. The printing device may forward paper information 408 whenever a new paper delivery is made or new paper brought to the printing device. Alternatively, paper information 408 may be sent when requested by reference printing device 108 or at set times during the day or week.

Reference printing device 108 stores paper information 408. For example, reference printing device 108 may store the paper information in paper data list 510. First paper information 512 is stored based on the information captured for first paper 504 by scan device 502 along with timestamp 513. Second paper information 514 is stored based on the information captured for second paper 506 by scan device 502 along with timestamp 515. Third paper information 516 is stored based on the information captured for third paper 508 by scan device 502 along with timestamp 517.

When a paper is to be used at the printing device, a check may be made to reference printing device 108 to determine whether the paper is acclimated. The disclosed embodiments may check the information in paper data list 510 to ensure that the paper is acclimated based on the stored timestamp. If the acclimation period has not elapsed, then a warning may be displayed to the operator at the printing device. Printing operations may not necessarily be stopped but the operator is made aware that problems may occur with printing reproduction. If a problem occurs at the printing device, then virtual calibration system 102 may verify when the paper used in the printing operation was scanned and if the acclimation time is an issue. These features may result in lowering of service calls because paper is being used too soon than specified by paper acclimation time 416.

Figure 6:
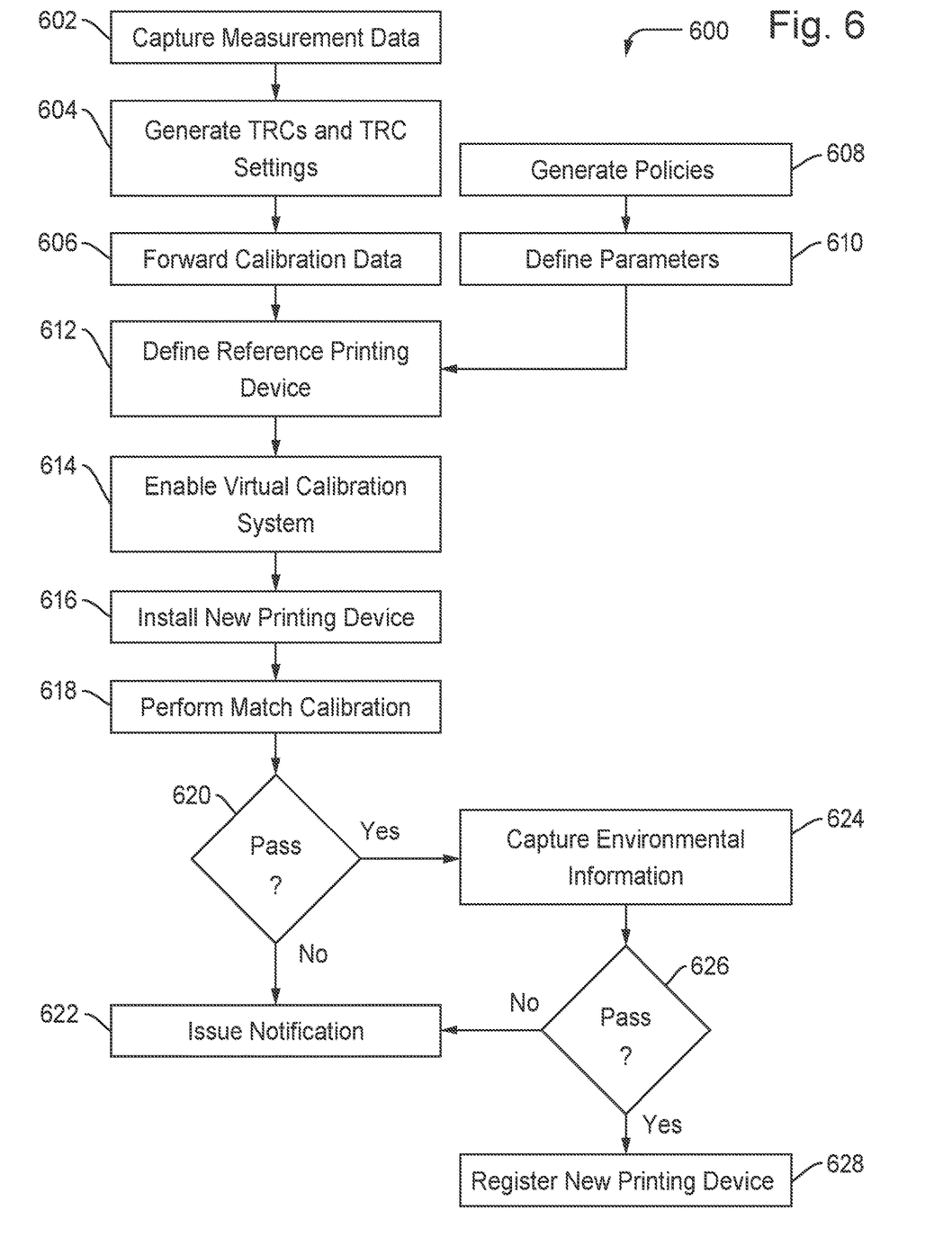
FIG. 6 illustrates a flowchart for using the reference printing device in a virtual calibration system according to the disclosed embodiments.

FIG. 6 depicts a flowchart 600 for using reference printing device 108 in a virtual calibration system 102 according to the disclosed embodiments. Flowchart 600 may refer to FIGS. 1-5 for illustrative purposes. The embodiments disclosed by flowchart 600, however, are not limited by the embodiments disclosed by FIGS. 1-5.

Step 602 executes by capturing measurement data 304 at initial printing device 104 using calibration operations. As disclosed above, the operator may perform the calibration operations using a target printed at printing device 104. The operator captures the measurement data using the target. Step 604 executes by generating calibration TRCs 302 and TRC settings 306 from measurement data 304. Printing device 104 may use these items for printing operations to improve reproduction. Step 606 executes by placing calibration TRCs 302, measurement data 304, and TRC settings 306 into calibration data 110 at printing device 104 and forwarding calibration data 110 to virtual calibration system 102. Calibration data 110 may serve as the basis for color printing resources.

Step 608 executes by generating policies 114 that set forth the operating conditions for printing devices within system 100 and subject to verification by virtual calibration system 102. Step 608 may execute independently from steps 602-606. Policies 114 are provided to virtual calibration system 102. Step 610 executes by defining parameters to be used by environmental specification information 120 to monitor and verify the operating conditions of the connected printing devices. Example parameters are disclosed above.

Step 612 executes by defining reference printing device 108 using calibration data 110 as color printing resources 118 and environmental specification information 120 derived from policies 114. As disclosed above, reference printing device 108 physically may be the same actual printing device as printing device 104 but uses color printing resources when it is defined, whereas the color printing resources used by printing device 104 may change over time. Step 614 executes by enabling virtual calibration system 102 to monitor and verify printing devices brought into the system.

Step 616 executes by installing a new printing device, such as printing device 130. As part of the installation, printing device 130 is evaluated and verified by virtual calibration system 102 using reference printing device 108. Step 618 executes by performing a match calibration of printing device 130 to reference printing device 108 using color printing resources 118. Match calibration data 134 may be forwarded to printing device 130. Match calibration data 134 may include the information from color printing resources 118, including calibration TRCs 302, measurement data 304, and TRC settings 306. The match calibration operation is disclosed above.

Step 620 executes by determining whether printing device 130 passed the match calibration operation. A pass/fail status 320 may be generated that indicates whether the match calibration is successful. If no, then step 622 executes by issuing notification 122. Notification 122 may alert the operator that the match calibration is not successful. Perhaps some maintenance needs to be done on the printing device. Notification 122 also may include a warning on continued use of printing device 130 based on the verification attempt by virtual calibration system 102.

If step 620 is yes, then step 624 executes by capturing environmental information B 138 at printing device 130. As disclosed above, temperature 402, humidity 404, ink temperature 406, and paper information 408 is determined and provided to reference printing device 108. Environmental information B 138 is then evaluated in view of the parameters defined for environmental specification information 120.

Step 626 executes by determining whether printing device 130 passed the verification operations based on environmental information B 138. If no, then printing device 130 has an operating condition that is not within the prescribed parameters for printing devices within system 100, as set forth by policies 114. Flowchart 600 proceeds to step 622, disclosed above. If step 626 is yes, then step 628 executes by registering the new printing device, or printing device 130, with virtual calibration system 102. Reference printing device 108 may include printing device 130 on list 136 of accepted printing devices within virtual calibration system 102. When printing within system 100, virtual calibration system 102 may check list 136 to make sure the printing device is available and verified.

Figure 7:
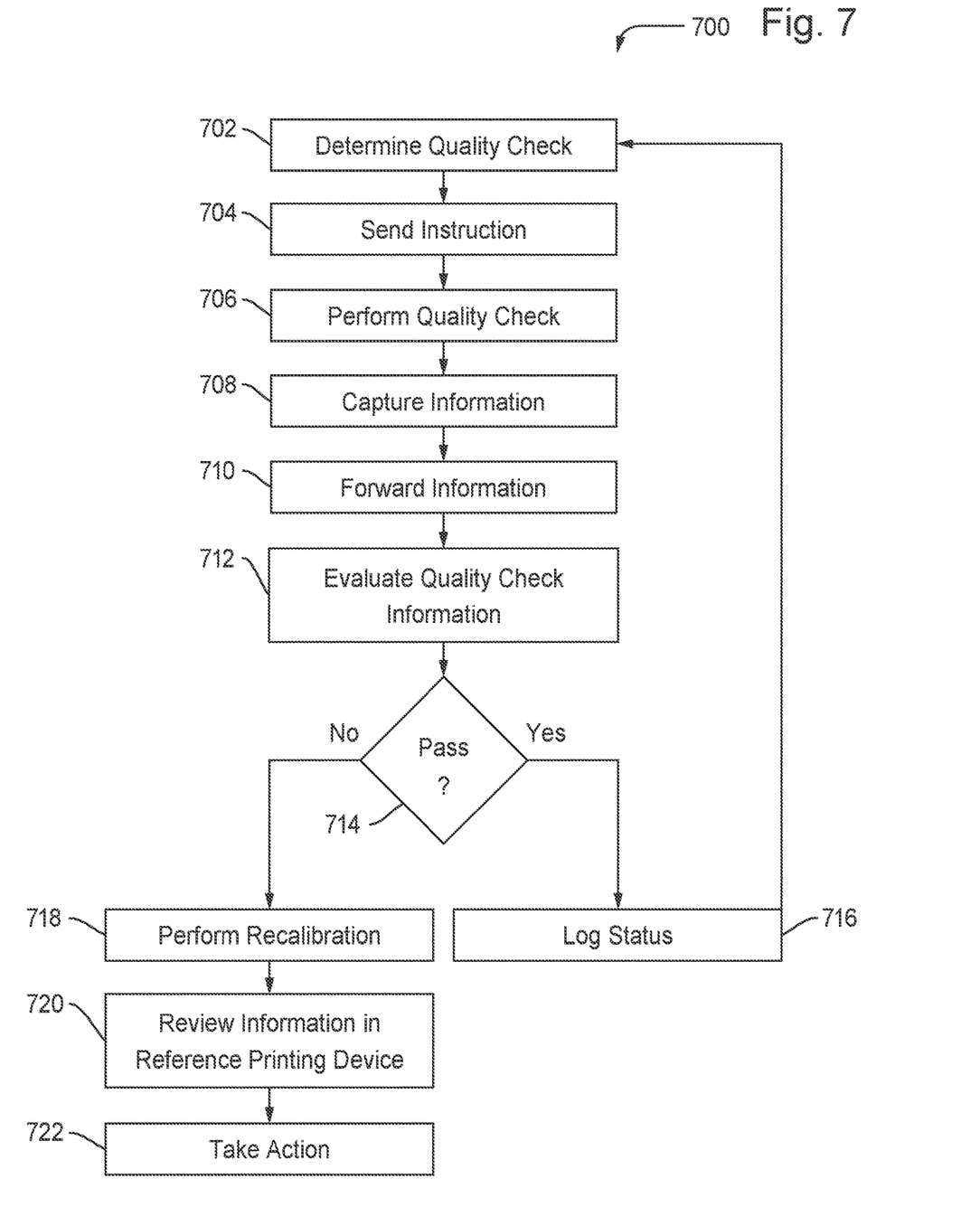
FIG. 7 illustrates a flowchart for monitoring a printing device within the virtual calibration system according to the disclosed embodiments.

FIG. 7 depicts a flowchart 700 for monitoring a printing device within virtual calibration system 102 according to the disclosed embodiments. Flowchart 700 may refer to FIGS. 1-6 for illustrative purposes. The embodiments disclosed by flowchart 700, however, are not limited by the embodiments disclosed by FIGS. 1-6. Flowchart 700 may apply whenever reference printing device 108 instructs a connected printing device to perform a quality check. Policies 114 may set forth how often quality checks are performed at a printing device. For illustrative purposes, printing device 130 will be used in the disclosure of flowchart 700, but the same principles may apply to printing device 104.

Step 702 executes by determining that a quality check needs to be performed at printing device 130. As disclosed above, quality check schedule 420 may be a parameter defined by policies 114 and used by reference printing device 108 to know when to send a quality check, such as quality check B 140. For example, quality check schedule 420 may indicate to perform a quality check B 140 every Thursday at 2 pm. Step 704 executes by sending an instruction to perform quality check B 140 at printing device 130.

Step 706 executes by performing quality check B 140 at printing device 130. This step also may include ensuring that quality check B 140 is performed within quality check measurement window 422, which is another parameter defined by policies 114 at reference printing device 108. A quality check may involve printing a target at printing device 130 and measuring patches or other data on the target using scan device 502. The quality check may indicate the color printing performance currently available at printing device 130. Step 708 executes by capturing information about printing device 130 along with capturing measurement data from the quality check. The quality check also may include capturing information about printing device 130, such as temperature 402, humidity 404, ink temperature 406, and any paper information 408 not yet reported to reference printing device 108.

Step 710 executes by forwarding the information, such as environmental information B 138, to reference printing device 108 from printing device 130. Printing device 130 also may send measurement data resulting from capturing color printing results using the target. Step 712 executes by evaluating the quality check information against parameters specified by policies 114. These parameters may be within environmental specification information 120. As disclosed above, environmental information B 138 may be compared to temperature range 410, humidity range 412, and ink temperature range 414. Any observed changes in the temperature, humidity, or ink temperature may be compared to temperature change rate 411, humidity change rate 413, and ink temperature change rate 415. Color printing measurement data may be evaluated in light of color printing resources 118. Reference printing device 108 may determine whether printing device 130 is meeting the specifications for color printing reproduction.

Step 714 executes by determining whether the data and information from the quality check passes or fails according to the evaluation. A status may be determined from printing device 130. If any of the data or information falls outside the parameters specified by policies 114, then the printing device may fail the quality check. It also may fail if the color printing results do not meet the standards set forth at reference printing device 108. If step 714 is yes, then printing device 130 passes the quality check. Step 716 executes by logging the status at reference printing device 108, such as in list 136. If, for some reason, the quality check is not performed at printing device 130, then this information may be shown at printing device 130 and logged at reference printing device 108.

If step 714 is no, then printing device 130 fails the quality check. It does not mean, however, that there is a problem with the color printing at the printing device. Other factors may be causing the printing device to fail. Step 718 executes by performing a recalibration at printing device 130 to ensure the color printing resources are up to date. In some instances, the disclosed embodiments may repeat the match calibration disclosed above. Step 720 executes by reviewing the information and data compiled during the quality check at reference printing device 108. An operator may review to see if any of environmental information B 138 indicates that the temperature or humidity at the printing device or the ink temperature of the ink at the printing device falls outside the parameters from these features. Should there be an issue with the color reproduction for printing device 130, the operator at the location of reference printing device 108, and not printing device 130, will have the option to review the information using virtual calibration system 102.

Step 722 executes by taking an action to change the status from fail to pass at printing device 130. If anything is out of compliance, then the operator may request that the customer or operator at printing device 130 correct the issues before someone is sent to address possible color printing issues. This feature makes sure that support staff are not sent to customer locations to address what in reality is not a printing device problem but an environmental or maintenance issue.

For example, if printing device 130 fails quality check B 140, then reference printing device 108 may evaluate temperature 402, humidity 404, and ink temperature 406 returned as environmental information B 138. Ink temperature 406 relates to the temperature of the color ink as it is being used for printing. Reference printing device 108 determines that it falls outside ink temperature range 414. Thus, the operator at printing device 130 may be instructed to take actions to address the temperature issue and then may redo the quality check. If the quality check now passes, then time and money is saved by not sending out support staff to address what is actually an ink temperature issue and not a color printing issue.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for using a cloud-based printing system, the method comprising:
    defining a reference printing device in the cloud-based printing system using color printing resources and environmental specification information;
    monitoring the reference printing device to be in compliance with requirements for the color printing resources and the environmental specification information;
    installing a new printing device within the cloud-based printing system;
    performing a match calibration of the new printing device to the reference printing device using the color printing resources including a first tone reproduction curve having a first plurality of density values for at least one color, the first tone reproduction curve received from the reference printing device and a second tone reproduction curve having a second plurality of density values for at least one color, the second tone reproduction curve stored at the new printing device;
    determining the match calibration is successful if the second plurality of density values of the second tone reproduction curve is equal or greater than the first plurality of density values of the first tone reproduction curve;
    comparing environmental information for the new printing device to the environmental specification information of the reference printing device;
    adding the new printing device to the cloud-based printing system if the match calibration is successful; and
    alerting an operator if the match calibration is not successful or if the environmental information for the new printing device does not meet the environmental specification information for the reference printing device.

2. The method of claim 1, further comprising downloading the color printing resources to the new printing device from the reference printing device.

3. The method of claim 1, wherein the environmental information for the new printing device includes temperature, humidity, or ink temperature.

4. The method of claim 1, further comprising scanning information for a paper or media type at the new printing device.

5. The method of claim 4, further comprising uploading the information for the paper or media to the reference printing device along with a time stamp.

6. The method of claim 5, further comprising determining whether the paper or media is useable for printing operations at the reference printing device.

7. The method of claim 1, further comprising performing a quality check at the new printing device and sending the quality check to the reference printing device.

8. The method of claim 7, further comprising determining a pass or fail status at the reference printing device for the new printing device based on the quality check.

9. A cloud-based printing system comprising:
    a plurality of printing devices;
    a reference printing device having color printing resources and environmental specification information defined in a policy, wherein the policy is applied to the plurality of printing devices; and
    an installed printing device of the plurality of printing devices,
    wherein the installed printing device performs a match calibration to the reference printing device using the color printing resources including a first tone reproduction curve having a first plurality of density values for at least one color, the first tone reproduction curve received from the reference printing device and a second tone reproduction curve having a second plurality of density values for at least one color, the second tone reproduction curve stored at the installed printing device,
    wherein the installed printing device determines the match calibration is successful if the second plurality of density values of the second tone reproduction curve is equal or greater than the first plurality of density values of the first tone reproduction curve, such that that installed printing device is added to the plurality of printing devices if the match calibration is successful,
    wherein the installed printing device performs, if the match calibration is not successful, a quality check when instructed by the reference printing device by printing a target using the color printing resources and capturing measurement data from the target and capturing environmental information about the installed printing device, wherein the reference printing device evaluates the quality check including the measurement data and environmental information according to the policy and the match calibration, and wherein the reference printing device determines whether an issue exists with color reproduction at the installed printing device based on the quality check or the match calibration.

10. The cloud-based printing system of claim 9, wherein the reference printing device determines that the issue is not with the color printing resources based on quality check.

11. The cloud-based printing system of claim 9, wherein the color printing resources include a target output generated by the reference printing device.

12. The cloud-based printing system of claim 9, wherein the environmental specification information includes a temperature range or a humidity range for the installed printing device.

\* \* \* \* \*